Nov. 4, 1958　　　　A. M. BLOOM　　　　2,858,763
ROASTING MACHINE FOR WIENERS
Filed Nov. 13, 1953　　　　　　　　3 Sheets-Sheet 1

INVENTOR,
ABE M. BLOOM
By
ATTORNEYS.

Nov. 4, 1958　　　A. M. BLOOM　　　2,858,763
ROASTING MACHINE FOR WIENERS
Filed Nov. 13, 1953　　　　　　　　3 Sheets-Sheet 2

INVENTOR,
ABE M. BLOOM
BY　Flam and Flam
ATTORNEYS.

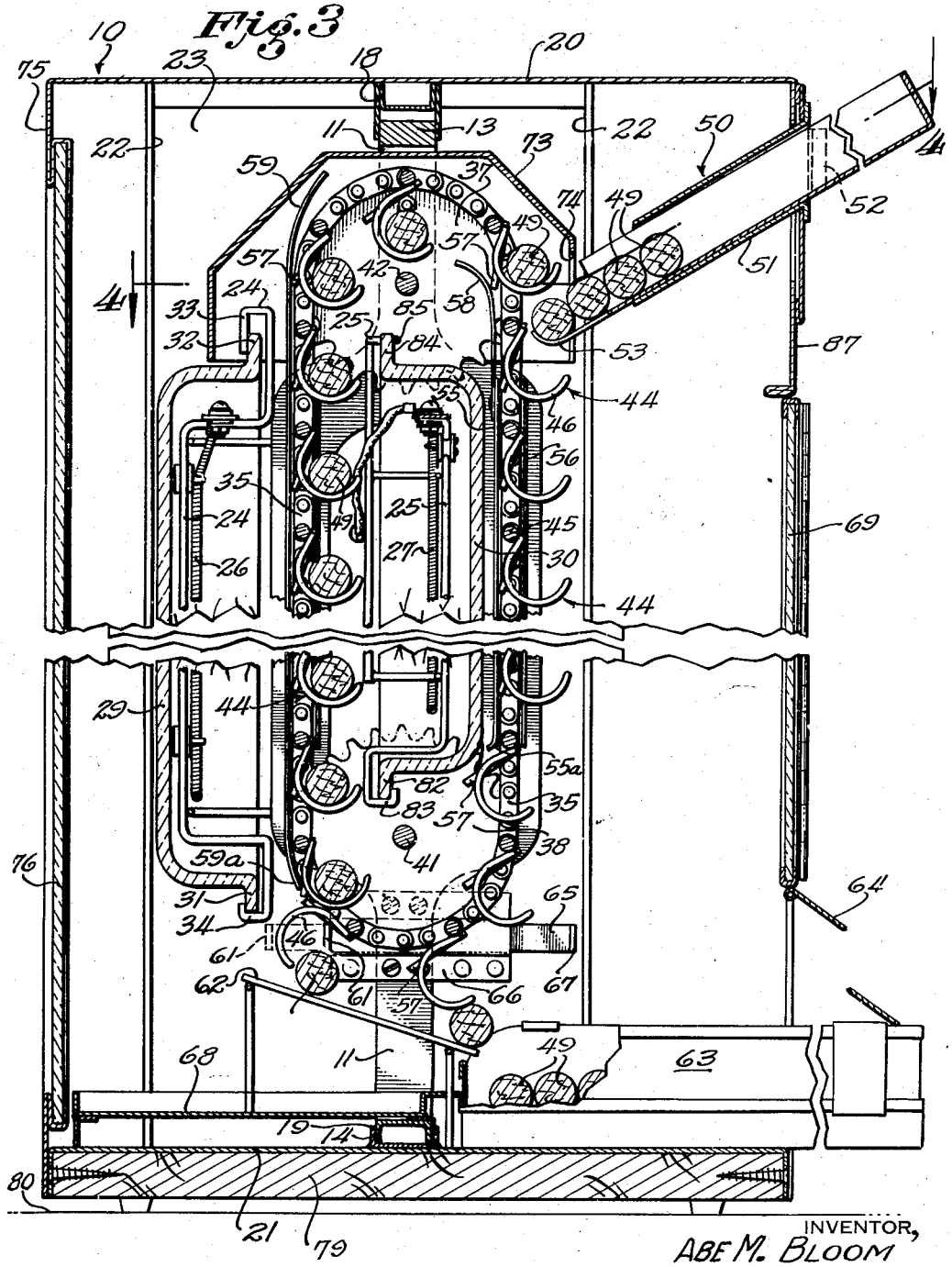

United States Patent Office 2,858,763
Patented Nov. 4, 1958

2,858,763

ROASTING MACHINE FOR WIENERS

Abe M. Bloom, Van Nuys, Calif.

Application November 13, 1953, Serial No. 391,968

15 Claims. (Cl. 99—427)

This invention relates to apparatus for roasting and broiling food, such as frankfurters, meat patties, and the like, for use especially by purveyors or caterers.

Apparatus of this general character is shown and described in my copending application, Serial No. 301,824, filed July 31, 1952, and entitled, Wiener Roasting Machine, now Patent No. 2,705,913, issued April 12, 1955.

It is important that the apparatus utilize the advertising value of the sight of cooking food to attract potential customers. Accordingly, in embodiments of the present invention, the apparatus is enclosed in a glass case, and the cooking food is within the full sight of the customers. To provide such an apparatus in a compact manner, use is made of an endless conveyor having spaced vertical runs, one of the runs passing between heating elements.

It is an object of the present invention to provide an improved apparatus of this character.

It is another object of this invention to provide novel means for definitely locating the food articles with respect to the heating elements. For this purpose, use is made of guides cooperating with individual pivoted cradles carrying the food. The load on the cradle exerts a torque maintaining the cradles in guided relationship.

It is another object of this invention to provide a simple apparatus including a vertical conveyor for uniformly and effectively cooking flat food articles, such as hamburgers. For this purpose, the cradle structures are guided in such manner that they incline the food article at an angle of approximately 45°, so that one side of the article receives radiation from the heating elements on one side of the conveyor run, and the other side of the articles receives radiation from the heating elements on the other side of the conveyor run, the substantial inclination of the food article to the vertical obviating a complicated cradle structure and ensuring against sagging of the article.

In preparing frankfurters, it may be desirable to provide optional modes of operation. Thus, for example, if the sales are rapid, the mechanism may be operated to discharge frankfurters from the conveyor after passing the heating elements. If the sales are not rapid, it may be operated to carry the frankfurters through repeated cycles of operation, in this instance utilizing less energization of the heating elements and/or a slower operation of the conveyor mechanism. These two modes of operation are provided by manipulation of a retractable tripper mechanism, similar to that shown in my copending application.

It is an object of the present invention to provide an automatic loader for the mechanism that is operable for either mode of operation without special attention of the operator. For this purpose, a novel arrangement of the structure is provided that loads a cradle only in the event that the cradle is empty. Thus, if the tripping mechanism is operative, empty cradles pass the loader and a frankfurter is transferred thereto. If the tripping mechanism is inoperative so that cradles containing a frankfurter pass the loader, the loader is inoperative. This latter mode of operation ensures a full load of food articles during recycling, and automatically operates to load the cradles should the tripping operation be started. This is made possible by a novel arrangement of parts whereby the frankfurter itself in the filled cradle causes the cradle to bypass the loader.

It is another object of this invention to preheat the frankfurters in the loader before being transferred to the conveyor so that the frankfurters are at a uniform temperature at the start of the cooking operations. By these means, the extent of cooking of the articles is accurately controlled. To accomplish this purpose, the loader itself acts to guide heated air from the broiler past the food articles in the loader.

It is still another object of this invention to provide a device of this character that can readily be cleaned. For this purpose, the operative mechanism is slidably removable through a side wall of the glass housing. The removable structure carries all the operative portions of the structure, and obviates detachable driving connections for the conveyor and detachable electrical couplings.

It is still another object of this invention to provide an improved cradle structure that can in a simple and convenient manner be detached from the conveyor.

It is still another object of this invention to provide a roasting and broiling device that ensures a uniform high quality cooking of food articles.

It is still another object of this invention to provide a novel cradle structure for cooking flat food articles, such as hamburgers, and that operates in a novel manner to discharge the items from the cradle after cooking. For this purpose, the cradles are so supported that the weight of the food article causes the cradle to discharge the article, such discharge being permitted upon passage of the cradle beyond guides that otherwise maintain the cradle in a definite food retaining position.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3 is a still further enlarged broken vertical sectional view, taken along the plane indicated by line 3—3 of Figs. 1 and 2;

Fig. 3a is a fragmentary sectional view of a portion of the apparatus shown in Fig. 3, but showing another mode of operation;

Fig. 4 is an enlarged fragmentary horizontal sectional view, taken along the plane indicated by line 4—4 of Figs. 1 and 3.

A generally rectangular housing or enclosure 10 accommodates the apparatus for cooking the food articles.

Figure 2:
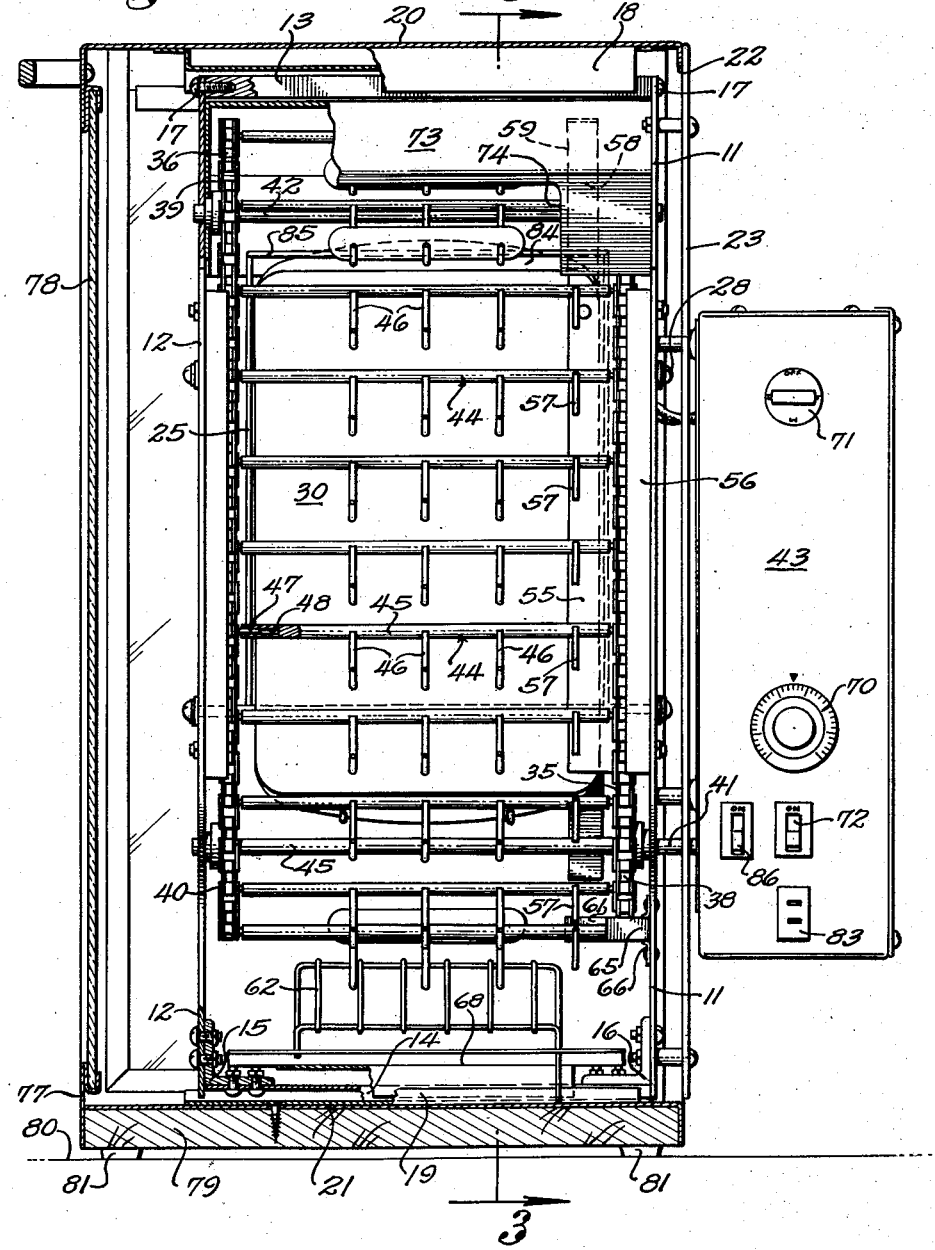
Fig. 2 is an enlarged vertical sectional view, taken along the plane indicated by line 2—2 of Fig. 1.

A cage structure supports heating elements and a conveyor for moving the food articles past the heating elements. This cage structure is generally rectangular in configuration and is formed by two opposed, vertically extending, parallel bracket plates 11 and 12 (Figs. 2 and 3). Narrow extensions at the top of each bracket plate 11 and 12 are secured at the top respectively to opposite ends of an upper horizontal frame member 13; similar extensions are each similarly secured at the bottom to opposite ends of a lower horizontal frame member 14. Angle brackets 15 and 16 are disposed at the inside lower corners of the cage structure, and screws 17, passing through the upper ends of the bracket plates 11 and 12 into the upper frame member 13, are also provided.

The frame members 13 and 14 are respectively slidable in upper and lower channels 18 and 19 secured to the top and bottom walls 20 and 21 of the housing structure 10.

The cage structure, formed by the frame members 13 and 14 of the plates 11 and 12, is thus slidably removable from, and slidably insertable into, the housing 10 through a lateral opening 22 in a side wall of the housing 10. A supporting cover plate 23, attached to plate 11, has edges overlying the opening 22 when the cage is fully inserted into the housing 10.

A pair of generally vertically extending wire frame structures 24 and 25 (Figs. 3 and 4) insulatingly support heating units 26 and 27 on the cage structure. These frame structures 24 and 25 are formed by generally horizontally and vertically extending wires secured to each other at their intersections to form a lattice-like configuration. The frame structures are opposed to, and horizontally spaced from, each other to define a space between which food articles may vertically pass. The wire frames 24 and 25, as shown most clearly in Fig. 4, are secured on the plates 11 and 12 by having the end of the horizontal wires bent around and secured to the outer surfaces of the plates 11 and 12, as by the aid of screws 28.

A pair of trough-like transparent refractory members 29 and 30 are respectively suspended on the frame structures 24 and 25. These refractory members cooperate to form a semi-enclosure for the heating elements 26 and 27, as well as reflectors for the radiant heat of these elements.

The refractory member 29 has an upper flange 32 accommodated in concavities defined by downwardly returned portions or retainers at the upper ends 33 of the vertical wires of the frame structure 24. A lower flange 31 of the refractory member 29 rests in concavities defined by upwardly returned portions or retainers at the lower ends 34 of the vertical wires of the frame structure 24.

The returned top and bottom ends 33 and 34 of the frame structure 24 are so formed that the refractory member 29 may be shifted upwardly so that its lower flange 31 clears the returned wire ends 34 at the bottom of the frame structure 24. Thereupon, the refractory member 29 may be slightly tilted and translated longitudinally to move out of engagement with the returned wire ends 33 at the top of the frame structure 24.

The refractory member 30 is removably supported in a substantially similar manner between the bracket plates 11 and 12 on the frame structure 25. This refractory member has a lower flange 82 resting in a concavity defined by upwardly returned portions of the lower ends 83 of the vertical wires of the frame structure 25. An upper flange 84 of the refractory member 30 is engaged by a wire 85 extending horizontally across the top of the frame 25 (Figs. 3 and 4). This refractory member is removable by shifting the refractory member 30 upwardly so that its lower flange 82 clears the returned wire ends 83 at the bottom. Thereupon, the refractory member may be slightly tilted and translated longitudinally to move out of engagement with the upper wire 85 of the frame structure 25.

The refractory members may be of a conventional type, such as commercially available refractory material, such as "Pyrex."

An endless conveyor structure, which carries horizontally extending food-carrying cradles 44, is supported on the cage structure such that these cradles are successively passed vertically between the spaced heating units 26 and 27 and refractory members 29 and 30.

The conveyor structure is formed by a pair of parallel endless sprocket chains 35 and 36 between which the cradles 44 are suspended.

The sprocket chain 35 extends about the outer elements of a first pair of vertically spaced upper and lower sprocket wheels 37 and 38 (Fig. 3). The other sprocket chain 36 extends about the outer elements of a second pair of vertically spaced upper and lower sprocket wheels 39 and 40.

The lower sprocket wheels 38 and 40 of each pair of sprocket wheels are located at opposite ends of the space between the lower portions of the plates 11 and 12. These lower sprocket wheels are coaxially mounted for movement in unison by a lower horizontal shaft 41. The shaft 41 has ends rotatably supported in bearings on the plates 11 and 12.

The upper sprocket wheels 37 and 39 of each pair of sprocket wheels are also located at opposite ends of the space between the upper portion of the plates 11 and 12. These upper sprocket wheels 37 and 39 are coaxially mounted for movement in unison by an upper horizontal shaft 42. The upper shaft 42 has ends rotatably supported in bearings on the upper portions of the plates 11 and 12. The sprocket chains 35 and 36 are thus supported in spaced parallel relationship for movement in unison.

The lower sprocket wheels 38 and 40 serve to drive the sprocket chains 35 and 36. For this purpose, a motor (not shown) is coupled to the right-hand end of the shaft 41, as viewed in Fig. 2. The motor is accommodated in a housing 43 mounted on the exterior of the supporting plate 23.

The cradle structures 44, as shown most clearly in Figs. 2 and 3, each have an elongate supporting bar 45 provided with coaxial end-opening recesses 48 respectively receiving correspondingly located pins 47 carried by links of the respective sprocket chains 35 and 36. The cradle structures are uniformly spaced along these chains.

The cradles 44 can easily be removed from, or placed upon, the sprocket chains 35 and 36 by outwardly flexing those portions of the sprocket chains intermediate the sprocket wheels. By such flexure, the pins 47 clear the ends of the end recesses 48 of the cradle bars 45. The cradles 44 can be successively removed from, or placed upon, the sprocket chains by movement of the chains to position the cradle 44 intermediate the sprocket wheels. The sprocket chains are normally under sufficient tension to ensure proper assembled relationship of the cradles 44.

A plurality of parallel spaced hook-like fingers 46 are secured (as by welding) to each supporting bar 45. These fingers 46 are correspondingly curved; their horizontally aligned concavities define a rest in which may be carried food articles, such as frankfurters 49. Other forms of cradle structures designed to accommodate other food articles can be secured to the sprocket chains in place of the cradles 44.

The pivotal mounting of the cradle structures 44 permits the cradle structures to have a vertical orientation to retain the food article in the rest irrespective of the position of the cradle structures along the conveyor.

As shown most clearly in Fig. 3, the conveyor structure comprising the sprocket chains 35 and 36 and the cradle structures 44 supported therebetween extends circuitously about one of the refractory members 30 and its associated heating unit 27. Accordingly, as viewed in Fig. 3, the left-hand portion of the conveyor passes between the heating units 26 and 27. This left-hand portion of the conveyor structure moves downwardly by imparting counterclockwise rotation of the sprocket wheels 38 and 40, as viewed in Fig. 3.

The right-hand portion of the conveyor accordingly moves upwardly. Provisions are made to load the cradles 44 with frankfurters 49 on the upper or outer run of the conveyor. For this purpose, a loader 50, generally of trough-like configuration and extending slantingly downwardly into the casing 10, is provided.

Figure 1:
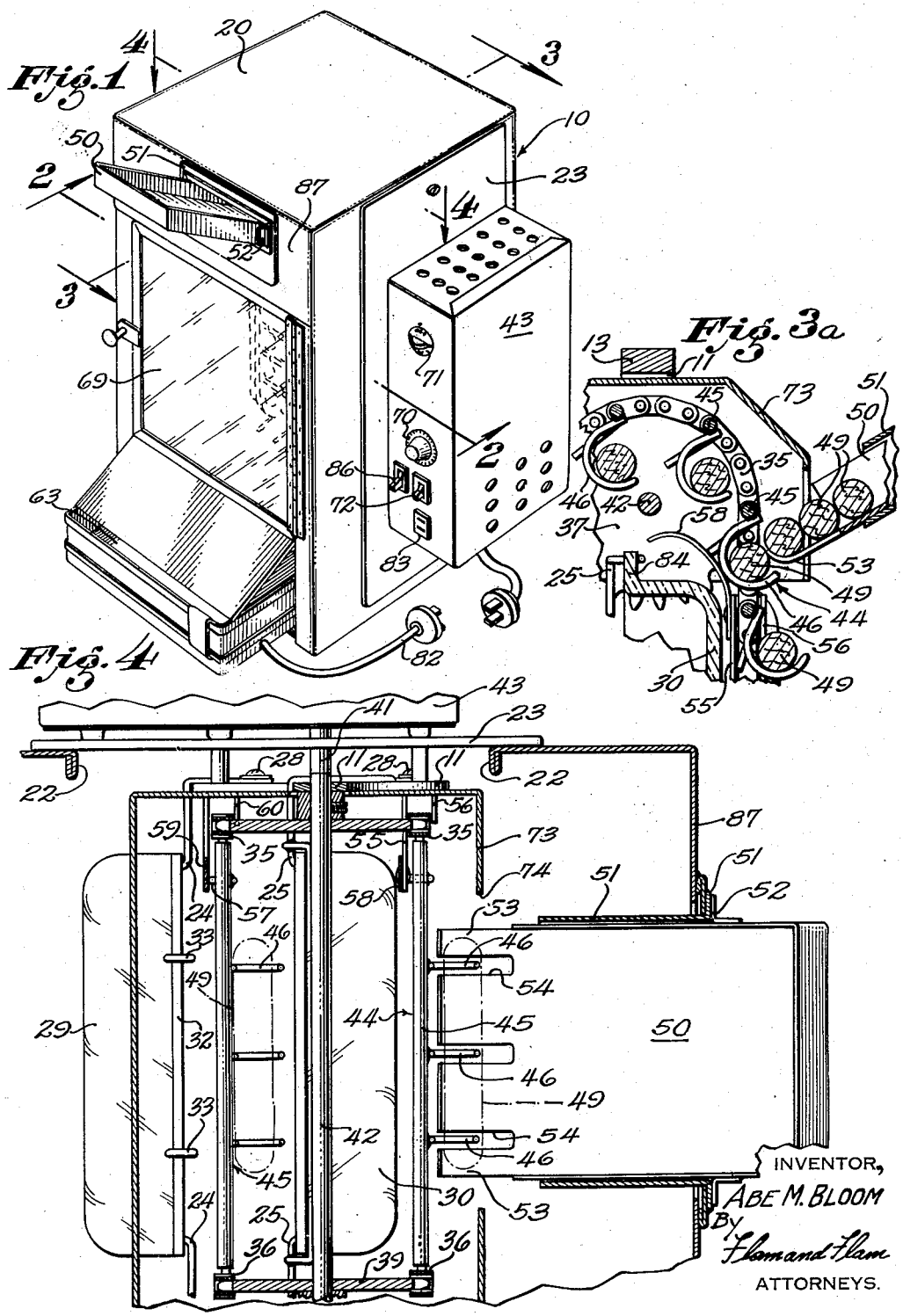
Figure 1 is a pictorial view of an apparatus incorporating the present invention.

An open-ended guide 51, secured to the wall 87 of the casing 10, properly aligns the loader 50 with respect to the cradles 44 carried by the conveyor structure. Angle brackets 52 (see, also, Fig. 1), secured to the side walls of the loader 50, cooperate with the edge of the outer opening of the guide 51 and determine the inwardmost position of the loader 50. The frankfurters 49 are supported in abutting side-by-side relationship in the loader 50.

The inner open end of the loader 50 has a projecting, upwardly curved strip 53 contiguous with the lower wall of the loader 50 (see, particularly, Figs. 3 and 4). This curved strip normally limits inward movement by gravity of the frankfurters 49 supported in the loader 50 by engaging the side of the inwardmost frankfurter.

The projecting strip 53 of the loader 50 is located in the path of upward movement of those cradles 44 on the upper run of the conveyor.

The projecting strip 53 of the loader 50 has a series of slots 54 (see, particularly, Fig. 4), permitting passage of the cradle fingers 46 therethrough. The supporting bars 45 of the cradles 44 clear the end of the projection 53. As the fingers 46 pass through the slots 54 of the loader 50, the end or inwardmost frankfurter 49 is lifted by the fingers 46 from the curved strip 53, whereby the frankfurter is transferred to the conveyor. When a cradle structure 44 picks up the frankfurters 49, the series of frankfurters remaining in the trough fall by gravity so that a frankfurter is lodged in position on the projecting end 53 to be picked up by the next succeeding cradle structure 44. Successive empty cradles thus pick up frankfurters in succession.

The angular position of the cradle structures 44 about the horizontal axis of movement to ensure accurate loading of the cradles 44 is normally determined by the aid of a vertically extending elongate track 55. This track is formed by an extended side of an elongate channel structure 56 (Fig. 4). This channel structure 56 is secured to one of the bracket plates 11. It also serves to guide the right-hand portion of the conveyor chain 30. A resilient extension or leaf spring 58 is secured to the upper end of the track 55 and forms a continuation thereof.

A guide pin 57, provided near the right-hand end of each cradle structure 44 as viewed in Fig. 2, engages the track 55, 58. The orientation of the cradle forming fingers 46 is such that their weight urges the cradle 44 angularly so that the guide pin 57 engages the track 55, 58. As the cradles move along the conveyor, the guide pin 57 slides along the track 55, 58. Accordingly, the cradle structures 44 are definitely oriented upon approaching the loader 50 to ensure proper transfer of frankfurters into cradle structures 44.

The extension 58, secured to the channel 56 and made of a resilient strip of material, forms the operative part of the track during actual transfer of the frankfurter 49 to the cradle structure 44. The upper part of the extension 58 is inwardly arcuately curved. This curved portion is operative during movement of the cradle along the outside element of the upper sprocket wheel 37. The curvature is such that, as the guide pin engages the extreme curved end of the strip 58, the center of gravity of the loaded cradle 44 is substantially vertically below the axis of the mounting shaft 45 of the cradle structure 44. Accordingly, the weight of the cradle 44, as it clears the track extension 58, causes no abrupt angular movement of the cradle structure.

A second track 59, formed by an extended side of a channel structure 60 and similar to the first described channel structure 56, cooperates with the guide pin 57 of the cradles definitely angularly to align the cradle structure 44 on the downward vertical run of the conveyor. The guide pin 57 is maintained in engagement with this track 59 by the weight of the loaded cradle 44 exerting a clockwise torque thereon.

The frankfurters 49 pass downwardly between the heating units 26 and 27. The refractory members 29 and 30 serve to concentrate and retain the heat in the space about the heating units 26 and 27 to ensure optimum cooking of the frankfurters 49. The cradle structures 44 permit substantially complete exposure of the frankfurter for cooking.

As the cradle structures 44 pass beyond the cooking zone, the guide pins 57 pass beyond the end 59a of the track 59 (Fig. 3). The entire loaded cradle structure 44 then pivots angularly under the influence of the torque exerted by the weight of the loaded cradle structure 44.

A projection 61, spaced from the end 59a of the guide 59, forms an abutment in the path of movement of the guide pin 57 and is so located that, upon continued movement of the cradle structures 44, the projection 61 urges the cradle structure 44 to an extreme clockwise position, as viewed in Fig. 3. In such extreme clockwise position, the concavity defined by the cradle fingers 46 is inverted, and the frankfurter is discharged therefrom.

The frankfurter 49 so discharged then rolls along an inclined rack 62 supported on the bottom of the casing 10. The lower end of the inclined rack 62 projects over the end of a trough-like warming unit 63 that rests on the bottom wall 21 of the casing 10. This warming unit maintains the frankfurters at an elevated temperature until removed. The unit 63 projects beyond the wall 87 of the casing 10 and is accessible via a hinged cover 64 for removal of a cooked frankfurter by the operator.

As the cradle structure 44 continues to move about the lower sprocket 38, the end of the guide pin 57 clears the projection 61, and the cradle structure 44 swings to its normal orientation under the influence of gravity. As the cradle structures 44 then begin the vertical run, the guide pins 57 engage the lower end 55a of the track 55. The cradle structures 44 are again definitely angularly positioned and may again pick up a frankfurter 49 from the loader 50.

The projection 61 is formed on the end of a U-shaped slide 65 that is manipulable by the operator to move the projection 61 to operative or inoperative position. The slide 65 is guidingly accommodated by the aid of an elongate bracket 66 secured to the bracket plate 11 (see, particularly, Figs. 2 and 3). The operative position of the projection 61 corresponds to the outwardmost position of the slide 65 in the bracket 66. Such outwardmost position is defined by engagement of the projection 61 with the inner end of the bracket 66. The projection 61 is out of the path of movement of the guide pins 57 when the slide is moved inwardly to the dotted-line position shown in Fig. 3. The slide 65 is selectively positioned by a finger piece 67 formed on the end of the slide 65. The inwardmost position of the slide is defined by engagement of the finger piece 67 with the outer end of the bracket 66.

A glass door 69 on the wall 87 of the casing 10 permits access for the operator, such as to manipulate the slide 65.

When the slide 65 is in inoperative position, the loaded cradle structure, after passing the end of the heating zone, is carried along the vertical upward run to be repassed through the apparatus. This mode of operation may be availed of when the entire capacity of the apparatus is not required. During such recycling operation, the heating units 26 and 27 may be operated at reduced heat, and the speed of the conveyor structure may also be changed. A suitable control 70, such as a rheostat, mounted on the motor casing 43, controls the speed of the motor. A thermostat or rheostat 71, also mounted on the motor casing 43, controls the intensity of the energization of the heating units 26 and 27. Substantially different combinations of speed of operation and intensity of heat may be provided in accordance with the requirements for different food articles.

A toggle switch 72 connects and disconnects the motor and the heating units 26 and 27 with respect to the commercial source of electrical energy.

When the loaded cradles are recycled, the resilient strip 58 (Fig. 3a) permits the loaded cradle automatically to bypass the loader structure 50 without disturbing the loader. The frankfurter 49 in a loaded cradle 44, approaching the loader 50, prevents passage of the cradle fingers 46 through the end of the loader structure 50. The interaction of the lower surface of the projecting strip 53 of the loader 50 and the frankfurter 49 in an already loaded cradle structure 44 causes the cradle structure to swing angularly in a clockwise direction upon continued upward movement of the cradle structure. Accordingly, the already loaded cradle 44 clears the projecting strip 53 of the loader 50. Such angular movement is permitted by inward flexure of the leaf spring or resilient strip 58.

Accordingly, during such time as the tripping projection 61 is out of operative position, the entire conveyor structure is loaded precisely to capacity if the loader 50 is kept supplied with frankfurters. The loader 50, in cooperation with the leaf spring 58, causes loading of frankfurters 49 only on those cradle structures 44 that are empty. If desired, less than a capacity load can be provided, such as by intermittent supply of frankfurters to the loader 50 or by loading the apparatus manually via the door 69. The change in the mode of operation of the apparatus from recycling to tripping or from tripping to recycling is automatically accompanied by proper loading of the cradle structures.

During recycling operation of the device, it may be desirable to discharge a particular cradle structure, as, for example, the one that is at the uppermost inaccessible part of the conveyor. Any attempt to move the conveyor manually meets with great resistance because of the necessity of rotating the reduction gearing between the motor and the conveyor. To make it possible rapidly to position the conveyor, a clutch mechanism may be interposed between the motor and the driving shaft 41 carrying the sprocket wheels 38 and 40. A lever 86, mounted on the motor casing, can be manipulated to uncouple the shaft 41 from the motor. Thereupon, the operator can quickly manually position the conveyor structure to make it possible for the projection 61 to discharge a particular frankfurter or to position the frankfurter intended to be removed at the accessible upper vertical run of the conveyor structure.

Optionally, the ratio of transmission could be materially increased for this purpose. In this mode of operation, the lever 86 would be used to selectively adjust the transmission mechanism.

A hood structure 73, secured between the bracket plates 11 and 12, serves to prevent material passage of the heat from between the refractory members 29 and 30. This hood structure 73 extends over the top of the conveyor structure.

The loaded cradles 44 pass arcuately in the hood structures 73 and, accordingly, are pre-heated prior to entrance between the refractory member 29 and 30 and the heating units 26 and 27.

Furthermore, the inner end of the loader structure 50 projects into the hood 73 via a recess 74 (see, particularly, Fig. 4). The hood is vented via the recess 74 and the loader 50. Passage of heated air through loader 50 preheats the frankfurters 49 therein so that, upon the start of the cooking operation, the frankfurters 49 are at a uniform temperature. Accurate control of the extent of cooking is thereby achieved. The lid 64, by the aid of which the warming pan is accessible, ensures against substantial convection currents through the cooking apparatus.

The front wall 75 of the casing 10 mounts a glass plate 76 so that the cooking operations may be seen by customers or passers-by. The side wall 77 of the casing (Fig. 2) opposite the cover plate 23 also mounts a glass plate 78 for this purpose. The bottom wall 21 of the casing rests upon an insulation base 79. A plurality of pads 81, secured to the lower surface of the base 79, rests upon an appropriate counter or surface 80.

A pan 68, supported by the casing 10 beneath the vertical downward run of the conveyor, collects drippings from the apparatus. This pan 68 is removable for cleaning purposes.

The warmer 63 has a power connection 82 cooperable with a socket 83 conveniently mounted on the motor casing 43. The warmer 63 is conveniently removable from the apparatus for cleaning purposes.

The inventor claims:

1. In apparatus for cooking food: an endless conveyor structure; a heating element along which a portion of the conveyor passes; a food carriage pivotally carried by the conveyor and mounted on an axis spaced from its center of gravity so that said carriage normally extends pendantly with respect to its axis of mounting; a guide pin carried by the carriage; and a track cooperable with the guide pin for determining the angular position of said carriage about its pivotal mounting sufficiently away from its normal pendant position that the weight of the carriage ensures engagement between the pin and the track, the guide accurately determining the spacing between the carriage and the heating element.

2. In apparatus for cooking food: an endless conveyor structure; a heating element along which a portion of the conveyor passes; a food carriage pivotally carried by the conveyor and mounted on an axis spaced from its center of gravity so that said carriage normally extends pendantly with respect to its axis of mounting; a guide pin carried by the carriage; a track cooperable with the guide pin for determining the angular position of said carriage about its pivotal mounting sufficiently away from its normal pendant position that the weight of the carriage ensures engagement between the pin and the track, the guide accurately determining the spacing between the carriage and the heating element; and a projection spaced from the end of said track and in the path of movement of said guide pin for tilting said carriage to an extreme angular position as said carriage passes said projection.

3. In apparatus for cooking food: an endless conveyor; a food supporting member pivotally mounted on the conveyor on an axis spaced from the center of gravity of the member so that said food supporting member normally extends pendantly with respect to said axes; a heating element along which a portion of said conveyor passes; a guide means carried by said member; and track means cooperable with the guide means to maintain said member in a definite angular position sufficiently away from its normal pendant position that the weight of the member ensures engagement between the guide means and the track means, the track means accurately determining the spacing between the member and the heating element.

4. In apparatus for cooking food: a conveyor; a food carriage pivotally carried by the conveyor on an axis spaced from the center of gravity of the carriage for translation thereby; said carriage including a plurality of substantially parallel fingers; a food loader with respect to which said carriage is relatively movable; said loader being in intercurrent relationship with said fingers when said carriage is at one portion of said conveyor for transfer of food articles from said loader to said carriage; a feeler member secured to the carriage; and guide means for the feeler member; the weight of the carriage urging the feeler member against the guide means, the guide means determining a loading position for said carriage.

5. In apparatus for cooking food: a conveyor; a cradle structure pivotally mounted on a horizontal axis on said conveyor structure for translation thereby, said axis being spaced from the center of gravity of the cradle structure, said cradle structure having a plurality of substantially parallel fingers correspondingly generally arcuately formed to provide aligned concavities forming a rest for an elongate article of food; an inclined loader in which elongate articles of food may be placed in side by side relationship, and having a plurality of restraining means limiting downward movement of the articles therein, the lower end of said loader being in intercurrent relationship with said fingers when said cradle structure is at one portion of said conveyor for transfer of articles of food from said loader to said cradle structure; a feeler member secured to the cradle structure; and guide means for the feeler member; the weight of the cradle structure urging the feeler member against the guide means, the guide means determining a loading position for said cradle structure.

6. In apparatus for cooking food: a conveyor movable in a substantially vertical plane; a cradle structure pivotally supported on the conveyor for translation thereby; said cradle structure having a plurality of spaced substantially parallel fingers correspondingly generally arcuately formed to provide aligned concavities forming a rest for an elongate article of food; an inclined loader in which elongate articles of food may be placed in side by side relationship; said loader having a projecting curved portion contiguous with the bottom surface of said loader and forming a restraint limiting downward movement of the food articles therein; said projecting portion being in juxtaposed relation to said fingers of said cradle when said cradle is in one position on said conveyor; said projecting portion permitting said fingers to pass therethrough; said curved projecting portion serving to swing the cradle about its pivotal mounting clear of the end of said projection portion if said cradle structure is already loaded; and a selectively operable tripping projection in the path of movement of said cradle for tilting said cradle to invert said concavities.

7. In apparatus for cooking food: a conveyor structruce movable in a substantially vertical plane; a cradle structure supported on said conveyor structure for translation thereby and pivotally mounted thereon for angular movement about a substantially horizontal axis; said cradle structure having a plurality of substantially parallel fingers dependingly mounted thereon and correspondingly generally arcuately formed to provide aligned concavities forming a rest for an elongate article of food; a loader slantingly downwardly projecting toward said conveyor structure and having an upwardly curved projection at its lower inner end contiguous with a food supporting surface of said loader; said projection being in the path of movement of said fingers and having slots for passage of said fingers therethrough; guiding means carried by said cradle structure; and elongate track means cooperating with said guiding means to align said fingers with respect to said projection.

8. In apparatus for cooking food: a conveyor structure movable in a substantially vertical plane; a cradle structure supported on said conveyor structure for translation thereby and pivotally mounted thereon for angular movement about a substantially horizontal axis; said cradle structure having a plurality of substantially parallel fingers dependingly mounted thereon and correspondingly generally arcuately formed to provide aligned concavities forming a rest for an elongate article of food; a loader slantingly downwardly projecting toward said conveyor structure and having an upwardly curved projection at its lower inner end contiguous with a food supporting surface of said loader; said projection being in the path of movement of said fingers and having slots for passage of said fingers therethrough; guiding means carried by said cradle structure; and elongate track means cooperating with said guiding means to align said fingers with respect to said projection; one of said means being yielding to permit angular movement of said cradle structure about its horizontal axis to clear said projection in the event that said cradle structure is already loaded.

9. In apparatus for cooking food: a conveyor structure movable in a substantially vertical plane; a cradle structure supported on said conveyor structure for translation thereby and pivotally mounted thereon for angular movement about a substantially horizontal axis; said cradle structure having a plurality of substantially parallel fingers dependingly mounted thereon and correspondingly generally arcuately formed to provide aligned concavities forming a rest for an elongate article of food; a loader slantingly downwardly projecting toward said conveyor structure and having an upwardly curved projection at its lower inner end contiguous with a food supporting surface of said loader; said projection being in the path of movement of said fingers and having slots for passage of said fingers therethrough; guiding means carried by said cradle structure; elongate track means cooperating with said guiding means to align said fingers with respect to said projection; said track means including a yielding portion operative when said cradle structure is at the level of said projection, said yielding portion permitting angular movement of said cradle structure to clear said projection in the event that said cradle structure is already loaded.

10. In apparatus for cooking food: a conveyor structure movable in a substantially vertical plane; a cradle structure supported on said conveyor structure for translation thereby and pivotally mounted thereon for angular movement about a substantially horizontal axis; said cradle structure having a plurality of substantially parallel fingers dependingly mounted thereon and correspondingly generally arcuately formed to provide aligned concavities forming a rest for an elongate article of food; a loader slantingly downwardly projecting toward said conveyor structure and having an upwardly curved projection at its lower inner end contiguous with a food supporting surface of said loader; said projection being in the path of movement of said fingers and having slots for passage of said fingers therethrough; guiding means carried by said cradle structure; elongate track means cooperating with said guiding means to align said fingers with respect to said projection; one of said means being yielding to permit angular movement of said cradle structure about its horizontal axis to clear said projection in the event that said cradle structure is already loaded; and a selectively operable tripping projection in the path of movement of said cradle for tilting said cradle to invert said concavities.

11. In apparatus for cooking food: an endless conveyor structure; a food carriage pivotally suspended by the conveyor structure for translation therealong, the axis of pivotal movement being spaced from the center of gravity of said carriage so that said carriage normally extends pendantly with respect to the said axes; a pair of heating elements supported in opposed relationship on opposite sides of the path of movement of said carriage; a feeler member carried by the carriage; and guide means for the feeler member determining an angular position of the carriage about its axis sufficiently away from its normal pendant position that the weight of the carriage ensures engagement between the feeler member and the guide means, the guide means accurately determining the spacing between the carriage and the heating elements.

12. In apparatus for cooking food, including an endless conveyor structure, a plurality of food carriages suspended by the conveyor structure for translation therealong, and a pair of heating elements supported in opposed relationship on opposite sides of the path of movement of said carriages, the combination therewith of a pair of refractory members extending about the elements respectively and defining a substantially confined space therefor; said members each having a pair of flanges adjacent opposite ends of the members; and frames for each member, each frame providing upwardly extending retainers into which one flange of the corresponding member is received, each frame providing a downwardly extending retainer spaced from and opposed to the upwardly extending retainer into which the other flange of the corresponding member is received; the flanges of the refractory members being so located with respect to the center of gravity of the members that the weight of each member acting about its one flange as a fulcrum point causes its other flange to engage the corresponding downwardly extending retainer, whereby each refractory member is positioned; each refractory member being upwardly movable to cause its corresponding one flange to clear the upwardly extending retainer, whereby each refractory member may be tilted about its other flange for removal of the refractory member from its frame.

13. In apparatus for cooking food: an endless conveyor movable in a substantially vertical plane; a food carriage suspended on the conveyor structure for translation therealong; heating means along which the carriage passes; a hood extending over the top of said conveyor and having a slot; a chute food loader for the carriage adjacent the top of said conveyor and having an inner end in registry with said slot and also forming a vent for said hood.

14. In apparatus for cooking food: a conveyor; a food carriage; means mounting the food carriage on the conveyor for pivotal movement about an axis; said carriage having a plurality of substantially parallel fingers; a food loader with respect to which said carriage is relatively movable; said loader normally being in intercurrent relationship with said fingers when said carriage is at one portion of said conveyor for transfer of food articles from said loader to said carriage; and guide means for normally determining the angular position of said carriage when said carriage passes said loader, said means including a yielding portion to permit pivotal movement of said carriage clear of the loader in response to interaction between an article of food already in the carriage and said loader.

15. In apparatus for cooking food: an endless conveyor structure; a pair of heating elements between which a portion of the conveyor passes; a food carriage pivotally supported by the conveyor on an axis spaced from the center of gravity of the carriage for translation thereby; said carriage including a plurality of generally parallel fingers; a food loader with respect to which said carriage is relatively movable, said loader having operative elements between which said fingers pass for transferring food from the loader to the carriage; elongate guide means extending along the conveyor; feeler means secured to the carriage and urged by the weight of said carriage into sliding engagement with said guide means accurately to determine the position of said carriage during loading and during passage between said heating elements.

References Cited in the file of this patent

UNITED STATES PATENTS

| | | |
|---|---|---|
| 1,197,145 | Olson | Sept. 5, 1916 |
| 1,423,765 | Hastings | July 25, 1922 |
| 1,506,843 | Komarnisky | Sept. 2, 1924 |
| 1,618,587 | Grady | Feb. 22, 1927 |
| 1,634,142 | Hammond | June 28, 1927 |
| 1,776,501 | Grady | Sept. 23, 1930 |
| 2,172,194 | Ehrgott | Sept. 5, 1939 |
| 2,602,392 | Panken | July 8, 1952 |
| 2,775,189 | Scholl | Dec. 25, 1956 |